(12) United States Patent
Volokh et al.

(10) Patent No.: US 8,807,882 B2
(45) Date of Patent: Aug. 19, 2014

(54) FACE MILLING CUTTER

(75) Inventors: Vladimir Volokh, Ma'alot (IL); Sergei Boulakhov, Nahariya (IL); Shay Zeidner, Cabri (IL); Leonid Sharivker, Nahariya (IL)

(73) Assignee: Hanita Metal Works, Ltd., Shlomi (IL)

( * ) Notice: Subject to any disclaimer, the term of this patent is extended or adjusted under 35 U.S.C. 154(b) by 907 days.

(21) Appl. No.: 12/245,421

(22) Filed: Oct. 3, 2008

(65) Prior Publication Data

US 2009/0252564 A1    Oct. 8, 2009

Related U.S. Application Data

(63) Continuation-in-part of application No. PCT/IL2007/000409, filed on Mar. 29, 2007.

(30) Foreign Application Priority Data

Apr. 4, 2006    (IL) .......................................... 174775

(51) Int. Cl.
*B23P 15/34*    (2006.01)
(52) U.S. Cl.
USPC .................... 407/53; 407/54; 407/60; 407/61
(58) Field of Classification Search
CPC ....................................................... B23C 5/10
USPC ........ 407/53, 54, 34, 63, 65, 61, 62; 408/227, 408/228
See application file for complete search history.

(56) References Cited

U.S. PATENT DOCUMENTS

| | | | | |
|---|---|---|---|---|
| 1,977,845 A | * | 10/1934 | Emmons | 76/108.2 |
| 5,094,573 A | * | 3/1992 | Hougen | 409/132 |
| 5,203,653 A | * | 4/1993 | Kudla | 408/207 |
| 5,433,655 A | | 7/1995 | Shiokawa et al. | |
| 5,685,671 A | * | 11/1997 | Packer et al. | 407/54 |
| 5,727,910 A | | 3/1998 | Leeb | |
| 5,810,517 A | | 9/1998 | Bostic | |

(Continued)

FOREIGN PATENT DOCUMENTS

| | | | | |
|---|---|---|---|---|
| DE | 3623176 A1 | * | 1/1988 | B27G 13/12 |
| JP | 55042760 A | * | 3/1980 | B23C 5/10 |

(Continued)

OTHER PUBLICATIONS

Feb. 6, 2014-kg-2449ilkr1-Translation_of_Notice.

*Primary Examiner* — Kenneth E. Peterson
*Assistant Examiner* — Jennifer Swinney
(74) *Attorney, Agent, or Firm* — Larry R. Meenan, Esq.

(57) ABSTRACT

A face milling cutter has a shank portion adjoining a cutting portion. The cutting portion terminates in a plurality of cutting edges extending in a radial direction from a central axis of the face milling cutter. The cutting edges are convexly curved at least along a part of their length. A portion of the cutting edges proximate the central axis is nearer in an axial direction to the shank portion than a point, X, on the cutting edges that is farthest away from the shank portion. A distance Y, between the point, X, and the central axis is between 20% and 40% of a diameter, D, of the face milling cutter, and a central portion extends the distance, Y, and has a radius of curvature of about 110% of the diameter, D.

12 Claims, 12 Drawing Sheets

(56) References Cited

U.S. PATENT DOCUMENTS

| | | | |
|---|---|---|---|
| 6,082,935 A * | 7/2000 | Hori | 407/54 |
| 6,158,927 A | 12/2000 | Cole et al. | |
| 6,193,446 B1 | 2/2001 | Astrom et al. | |
| 6,394,466 B1 | 5/2002 | Matsumoto et al. | |
| 6,439,811 B1 | 8/2002 | Wardell | |
| 6,497,540 B1 * | 12/2002 | Shikata et al. | 409/234 |
| 6,634,835 B1 | 10/2003 | Smith | |
| 6,655,880 B2 * | 12/2003 | MacArthur | 407/53 |
| 6,846,135 B2 * | 1/2005 | Kuroda et al. | 407/53 |
| 6,929,434 B2 * | 8/2005 | Prokop | 408/230 |
| 6,953,310 B2 * | 10/2005 | Iwamoto et al. | 407/54 |
| 6,976,815 B2 * | 12/2005 | Berglow et al. | 409/234 |
| 6,991,409 B2 * | 1/2006 | Noland | 407/63 |
| 7,094,005 B2 * | 8/2006 | Svensson | 407/53 |
| 7,125,210 B2 * | 10/2006 | Kolker et al. | 409/234 |
| 7,402,004 B2 * | 7/2008 | Tanaka et al. | 407/53 |
| 7,618,219 B2 * | 11/2009 | Osawa et al. | 407/53 |
| 7,753,624 B2 * | 7/2010 | Gunther et al. | 407/53 |
| 7,927,046 B2 | 4/2011 | Tanaka et al. | |
| 2002/0067964 A1 | 6/2002 | Sekiguchi et al. | |
| 2002/0141833 A1 | 10/2002 | MacArthur | |
| 2003/0053870 A1 * | 3/2003 | Flynn et al. | 407/30 |
| 2003/0118411 A1 | 6/2003 | Flynn et al. | |
| 2003/0175085 A1 | 9/2003 | Prokop | |
| 2003/0198525 A1 * | 10/2003 | Iwamoto et al. | 407/54 |
| 2005/0025584 A1 | 2/2005 | Kolker et al. | |
| 2005/0117982 A1 | 6/2005 | Dov et al. | |
| 2006/0188345 A1 | 8/2006 | Greenwood et al. | |
| 2007/0243030 A1 | 10/2007 | Staedt et al. | |

FOREIGN PATENT DOCUMENTS

| | | | |
|---|---|---|---|
| JP | 62141413 U | 9/1987 | |
| JP | 02256412 A * | 10/1990 | B23C 5/10 |
| JP | 9-309020 | 12/1997 | |
| JP | 2002187011 A * | 7/2002 | B23C 5/10 |
| JP | 2005224898 A * | 8/2005 | B23C 5/10 |
| JP | 2008-36722 | 2/2008 | |
| KR | 19930001459 B1 | 2/1993 | |
| WO | WO 2007/013447 | 2/2007 | |

* cited by examiner

FIG. 6

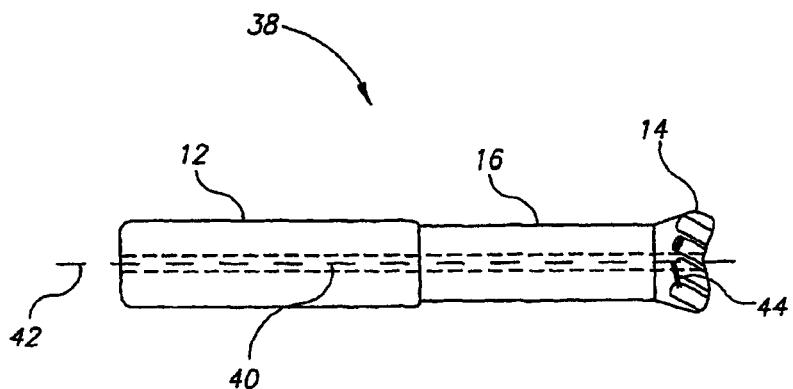

| | |
|---|---|
| TEST DATE | 30/11/2005 |
| OBJECT | TEST FOR CUTTER WEAR OF DIFFERENT END MILLS. 1.0mm WEAR ON OUTER DIAMETER CONSIDERED TOOL FAILURE |
| MILLING MACHINE | OKUMA TYPE MB56VA |
| WORKPIECE MATERIAL | ALLOY STEEL, AISI 4340 HARDNESS 45HRc |
| WORKPIECE DIMENSIONS | 700 X 250 X 70mm |
| END MILLS | 12mm DIAMETER, CARBIDE TIPPED, COATED AlTiN |
| SPEED | 4244 R.P.M. (=160 METERS/MINUTE PERIPHERAL) |
| FEED | 0.6 PER END MILL TOOTH (153M/MIN FOR 6 TOOTH END MILL, 10.2 M/MIN FOR 4 TOOTH END MILL) |
| AXIAL DEPTH OF CUT | 0.6mm |
| RADIAL DEPTH OF CUT | 6.6 (=55% OF END MILL DIAMETER) |
| COOLANT | AMBIENT TEMPERATURE AIR JET |

TEST RESULTS

| TOOL NUMBER AND TYPE | NO. OF POCKETS MACHINED | WEAR IN mm ON OUTER DIAMETER |
|---|---|---|
| 1. HANITA GEOMETRY A 6 TEETH, FEED RATE 0.6mm PER TOOTH. | 100 | 0.11 |
| 2. PRIOR ART END MILL 4 TEETH, TESTED AT FEED RATE OF 0.7mm PER TOOTH. | 11 | 0.1 |
| 3. HANITA GEOMETRY B 6 TEETH, FEED RATE 0.6mm PER TOOTH. | 100 | 0.1 |
| 4. SECOND-PRIOR ART END MILL, 4 TEETH, FEED RATE 0.6mm PER TOOTH. | 20 | 0.27 |
| 5. THIRD PRIOR ART END MILL, 4 TEETH, FEED RATE 0.6mm PER TOOTH. | 0.5 | CUTTING EDGE SEGMENT-SHAPED BREAKAGE. |

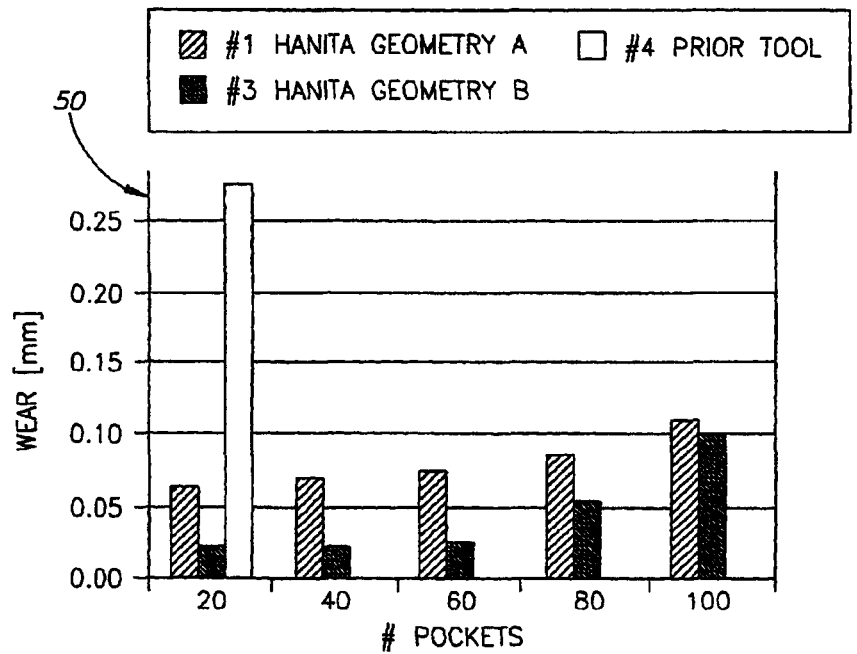

FIG. 9

FACE MILLING CUTTER

CONTINUING APPLICATION DATA

This application is a Continuation-In-Part application of International Patent Application No. PCT/IL2007/000409, filed on Mar. 29, 2007, which claims priority from Israeli Patent Application No. 174775, filed on Apr. 4, 2006. International Patent Application No. PCT/IL2007/000409 was pending as of the filing date of this application. The United States was an elected state in International Patent Application No. PCT/IL2007/000409.

BACKGROUND

1. Technical Field

The present application relates to tools for the machining of materials by milling.

2. Background Information

Background information is for informational purposes only and does not necessarily admit that subsequently mentioned information and publications are prior art.

Milling cutters are widely used in milling operations due to their versatile range of application and due to the moderate first cost of the tool. Milling cutters are often of cylindrical shape, and are available up to about eighty millimeter diameter, although the present application refers to the diameter range of about five millimeters to about thirty-two millimeters. Many milling cutters have flat ends; however, other shapes such as conical and rounded ends are also used. A milling cutter typically has two to ten teeth, depending on diameter size and whether for rough cutting or finishing. Teeth are usually of spiral shape, but can be straight parallel or virtually parallel to the axis. Material of construction is high speed steel, solid carbide, Cubic boron nitride, Poly crystal diamond, cermet, ceramic, and combinations thereof.

Some cutting tools include an insert having a plurality of cutting edges of inwardly directed V shaped geometry. The insert has inner and outer flank cutting edges with rounded corners. The cutting edge is divided by a chisel edge into roughing and finishing cutting portions.

Two known problems with regard to screw-on inserts are that high precision in positioning the insert is desired to restrict or minimize making over-size holes, and the screw holding the insert has a tendency to loosen due to vibration of the tool when in use. Yet a further problem regarding tools using two inserts is that high precision is indispensable in the settings of the two inserts which should be identical. Due to the size of the insert which should be large enough to allow setting and clamping, small and medium size holes can not be machined.

On side surfaces of similar inserts, a clearance surface formed on a protruding portion which, via a step clearance extends into a secondary helically twisted clearance surface, the chip angle of which increases with increasing cutting depth. The insert includes a chip breaker.

Some milling cutters have at least one flute with a low angle cutting surface while a second flute has a high angle cutting surface. The two flutes intersect to form a compound cutting surface.

Some milling cutters have flat bottoms and rounded corners. The corner configuration described improves resistance to chipping and fracture of the milling cutter.

Some milling cutters have an about thirty-five degree helix angle to about sixty degree helix angle and a core diameter about sixty-two percent to about sixty-eight percent of the outer diameter. Cutting edges are ultra-fine cemented carbide. These milling cutters improve chip discharge and reduce corner wear.

Some milling cutters have a highly smooth and polished cutting edge land bordering the cutting edge. The obvious problem here is that the polished area will not survive for more than a few minutes of work.

Some milling cutters of defined form are intended for executing rough machining and finish machining.

A large number of tooth forms for end mills and milling cutters are known. In order to decide which form is best, it would be desirable to run comparative and extensive machining tests on cutters made according to the various disclosures in the literature. Such tests have rarely been carried out due to the high expense involved. Presently, most inventors test run the form of their choice in a workshop, but even where machining test results are published, conditions of machining (material hardness, cutter diameter and material, number of teeth, machine rigidity, machining speed and feed, coolant composition, surface finish quality, whether the milling cutter is nitride coated or not, and yet further factors) are not standardized and can not be compared. In the absence of comparative test results it is difficult to assess the merits of prior-art disclosures regarding tooth shapes.

The face milling cutter according to the present specification has however been extensively tested and has been found to have improved machining results when used on practical work pieces, in comparison with other milling cutters which were tested on the same machining task. The present inventors (referred to in the test report by the name "HANITA") have carried out testing using milling cutters with twelve millimeter diameters with the primary criterion being wear on the maximum diameter of the tool while machining recesses in 4340 alloy steel.

Many prior-art milling cutters operate quite satisfactorily on non-ferrous metals and on soft steel. However, for cutting tool steel, a frequent requirement in the manufacture of dies, punches, casting dies, forging dies and press tools, feed rates drop sharply, vibrations are generated and tool breakage occurs.

OBJECT OR OBJECTS

It is therefore one of the objects of the present application to obviate the limitations of milling cutters and to provide a tooth form which significantly improves metal-removal rates.

It is a further object of the present application to provide such a face milling cutter with enhanced wear resistance.

SUMMARY

The present application achieves the above objects by providing a face milling cutter, in the range of a four millimeter to fifty-one millimeter diameter, for fast metal removal having a shank portion adjoining a cutting portion, said cutting portion terminating in a plurality of end cutting edges positioned substantially radially from the axis of the milling cutter, said end cutting edges being curved at least along part of their length as viewed facing the end of said milling cutter.

The present application provides an improved form for a rotary cutting tool such as a face end-mill, configured to extend tool life while increasing metal removal rates and reducing tool wear.

In a possible embodiment of the present application there is provided a face milling cutter wherein at least the outer portion of said cutting edges is made of a material harder than high speed steel.

In a further possible embodiment of the present application there is provided a face milling cutter as viewed in an elevation projection the center of said cutting edges is nearer in an axial direction to said shank than point X being the point furthest away from said shank in an axial direction;

Y=the distance between X and the cutter axis;

Z=the axial distance between X and (the center of the first position at which said tooth reaches the diameter D);

R1=the radius merging an end of R2 to L. Value of Z is between two percent and nine percent of D;

L=the axial length of the cutting edge disposed on the diameter D;

R2=the (radius) curves merging point X and extending over the axial length of Z;

R1=the radius merging an end of R2 to L; and

C=the angle between a straight radial line and a tangent meeting the outer extremity of the curved cutting edge.

In a further possible embodiment of the present application there is provided a face milling cutter wherein the value of Y is between twenty percent and forty percent of D.

In yet a further possible embodiment of the present application there is provided a face milling cutter wherein the value of R2, (if it is a radius) is in the range between five percent and fifteen percent of D, and selected to be between ten percent and fifteen percent for a milling cutter configured to machine hard materials and between five percent and ten percent for a milling cutter intended to machine soft materials.

In another possible embodiment of the present application there is provided a face milling cutter wherein the value of B exceeds fifteen degrees.

In a further possible embodiment of the present application there is provided a face milling cutter wherein the clearance surface of each tooth is curved to be substantially parallel to said cutting edge.

In another possible embodiment of the present application there is provided a face milling cutter wherein said material harder than high speed steel extends along the outer surface of milling cutter in an axial direction a distance L of about seventy percent to one hundred-eighty percent of D.

In another possible embodiment of the present application there is provided a face milling cutter wherein the radial angular spacing between a first tooth and a second adjacent tooth is unequal to the angular spacing between the second tooth and an adjacent third tooth.

In a possible embodiment of the present application there is provided a face milling cutter wherein a coolant conduit is provided leading from an axial passage through said shank portion and through a part of said cutting portion to at least one outlet proximate to said cutting edges.

It will be realized from consideration of the provided test results of the cutter that the present application the radially-curved tooth in combination with appropriate rake, clearance and helix angles, and coated, carbide teeth serves to provide a wear-resistant tool that far outlasts milling cutters available presently.

The use of brazing for attachment of the tungsten carbide cutting portion to the high speed steel body eliminates the holding screw and the holes desired for its passage. Elimination of these holes is most important to minimize tool breakage because the areas surrounding the holes are exposed to the high stress concentrations which lead to tool breakage.

Attention is drawn to the use of a parabolic shape, seen in FIG. 4, which has been found to be superior to the radius found on prior-art cutters. The cutting test results leave no doubt as to the importance of this innovation.

With regard to cutting speeds, "Machinery's Handbook" 16th edition, the recommendation is 30 for finishing cuts of 0.6 millimeters such as is the subject of the test report provided, is one hundred fifty feet to two hundred feet (forty-six to sixty-one meters) per minute, or eighty-five feet to one hundred twenty-five feet min, for alloy steels machined by uncoated carbide tools. The feed per revolution recommended is in the range of 0.004 inches to 0.04 inches (0.1 millimeter to 1 millimeter).

In the tests nitride coated carbide tools were used, at the much higher cutting speed of one hundred sixty meters/min. The feed (0.6 millimeter per tooth, i.e. 3.6 millimeters per revolution) is also far larger than the values given in the handbook. Furthermore, in the tests the cutter was cooled by an air jet, no liquid cooling was applied.

The milling cutter according to the present application could also be referred to as a face milling cutter, a face miller, an end-mill, or a face end-mill.

The present application will now be described further with reference to the accompanying drawings, which represent by example possible embodiments of the present application. Structural details are shown for a fundamental understanding thereof. The described examples, together with the drawings, will make apparent to those skilled in the art how further forms of the present application may be realized.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the drawings:

FIG. 6 is an elevational view of a possible embodiment of the milling cutter provided with an oil conduit;

FIG. 7 is a table of test conditions referring to tests of other milling cutters and milling cutters made according to the present application;

FIG. 8 is a view of the test results;

FIG. 9 is a bar graph also providing intermediate values of wear;

DESCRIPTION OF EMBODIMENT OR EMBODIMENTS

Figure 1:
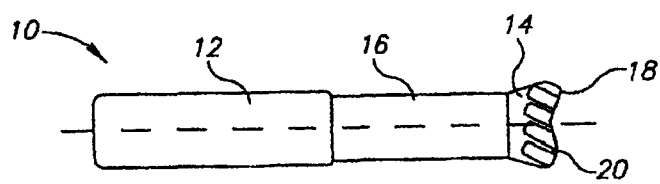
FIG. 1 is an elevation view of a possible embodiment of the milling cutter according to the present application.
Figure 2:
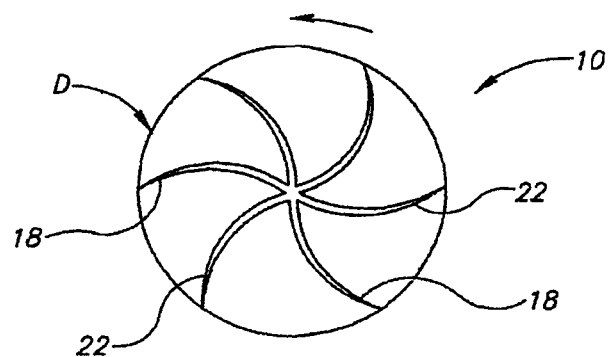
FIG. 2 is an end view, facing the end teeth, of the same embodiment.

There is seen in FIGS. 1 and 2 a milling cutter 10 for fast metal removal having a shank portion 12 connected to a cutting portion 14 by a neck portion 16. The cutting portion 14 terminates in a plurality of end cutting edges 18 positioned substantially radially from the axis of the milling cutter, the end cutting edges 18 being curved at least along part of their length as viewed facing the end 20 of the milling cutter cutting portion 14.

In one possible embodiment of the present application, the diameter of the shank portion 12 of the milling cutter 10 is about one hundred twelve and a half percent of the diameter of the neck portion 16. At the largest circumference of the cutting portion 14, the cutting portion 14 is about one hundred thirty-three percent of the diameter of the neck portion 16.

The tooth of cutting portion has a depth of about 0.1 D at each side of the outer diameter D, leaving a core equal to about 0.8 D. In combination with the short flutes, the resulting rigidity of the milling cutter 10 is a factor in allowing the high speeds and feeds which will be detailed further on.

In the present example, the cutting edge 18 forms a concave curve. As seen in the diagram, the milling cutter 10 rotates in an anti clockwork or counterclockwise direction.

In the present application the outer diameter D of the cutting portion 14 is in the range of about four millimeters to about fifty-one millimeters.

In one possible embodiment of the present application, the length of the teeth may vary in the range of about thirty-six percent and forty-five percent of D. The width of the teeth may vary in the range of about eight percent and about eleven percent of D. The width of the flutes may vary in the range of about thirteen to about fourteen percent of D.

Possibly, the clearance surface 22 of each tooth is curved to be substantially parallel to the cutting edge 18.

Figure 1A:
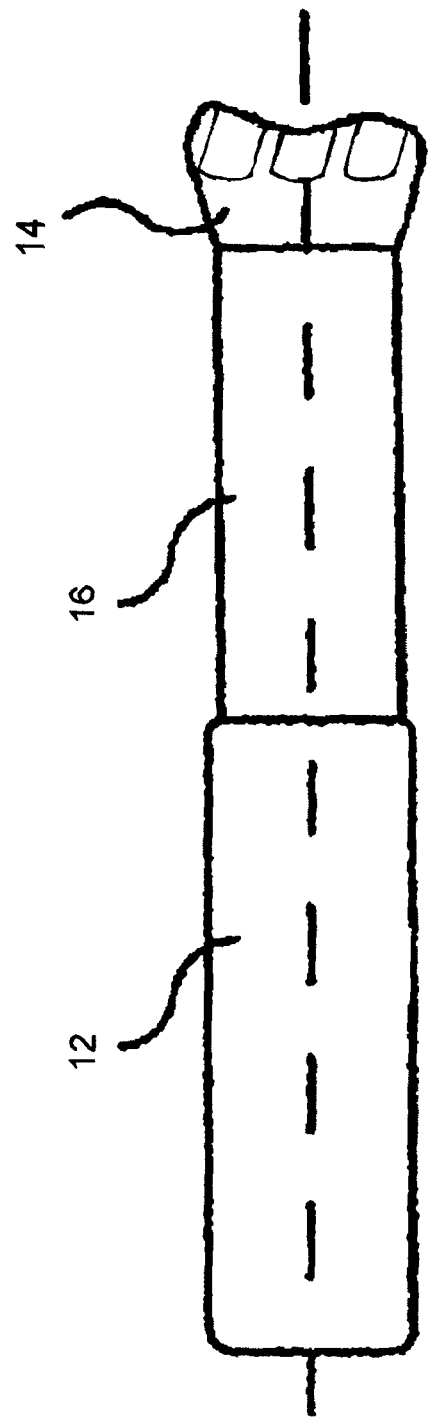
FIG. 1A is an elevation view of a possible embodiment of the face end-mill according to the present application.

FIG. 1A shows a face end-mill according to at least one possible embodiment of the present application, comprising a shank portion 12, a neck portion 16, and a cutting portion 14.

In the one possible embodiment illustrated in FIG. 1A, the teeth may comprise a length between about twenty-four percent and about twenty-nine percent of D. The teeth may comprise a width between about nine percent and ten percent of D. The flutes may comprise a width of about eighteen percent to twenty percent of D.

With reference to the rest of the figures, similar reference numerals have been used to identify similar parts.

Figure 3:
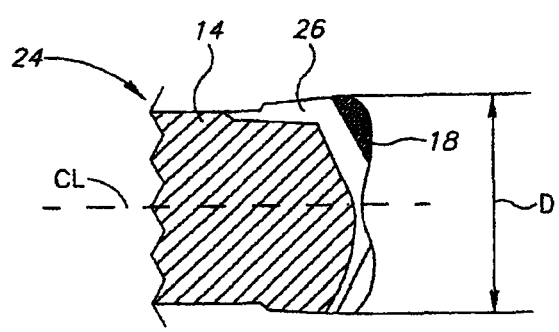
FIG. 3 is a sectional elevational view of the tip of a milling cutter provided with hard corners.

FIG. 3 illustrates the head of a milling cutter 24 wherein the outer portion of the cutting edges 18 are made of a material 26 harder than high speed steel, such as solid carbide, (Wolfram carbide,) Cubic boron nitride, Poly crystal diamond, cermets, ceramic, and combinations thereof.

The material 26 extends along the outer surface of the milling cutter 24 in an axial direction a distance of about seventy percent to about one hundred eighty percent of D. Thus for a twelve millimeter diameter cutter the hard material extends axially about 8.4 to 21.6 millimeters.

Seen in FIG. 4 is again the tip of a milling cutter 24. The portion 28 of the end cutting edges 18 near the milling cutter axis CL is nearer in an axial direction to the shank portion 12, seen in FIG. 1, than is the point X. X is the point furthest away from the shank in an axial direction. In other words, the central portion of the milling cutter is sunken in to form a broad V. In one possible embodiment of the present application, the broad V comprises a radius of curvature disposed away from the neck portion 16, measuring about one hundred ten percent of the diameter D.

D=the outer diameter D of the cutting portion 14;

Y=the distance between X and the cutter axis;

Z=the axial distance between X and (the center of the first position at which said tooth reaches the diameter D);

R1=the radius merging an end of R2 to L. Value of Z is between two percent and nine percent of D;

L=the axial length of the cutting edge disposed on the diameter D;

R2=the curve merging point X and extending over the axial length of Z;

B=the relief angle at each side of the milling cutter; and

C=the angle between a straight radial line and a tangent meeting the outer extremity of the curved cutting edge.

Some possible values are as follows:

The value of Z in one possible embodiment is between two percent and nine percent of D.

The value of Y in one possible embodiment is between twenty percent and forty percent of D.

The value of R2 in one possible embodiment is in the range between five percent and fifteen percent of D, and selected to be between ten percent and fifteen percent for a milling cutter configured to machine hard materials and between five percent and ten percent for a milling cutter intended to machine soft materials.

The value of B in one possible embodiment is between one degree and five degrees.

Figure 5:
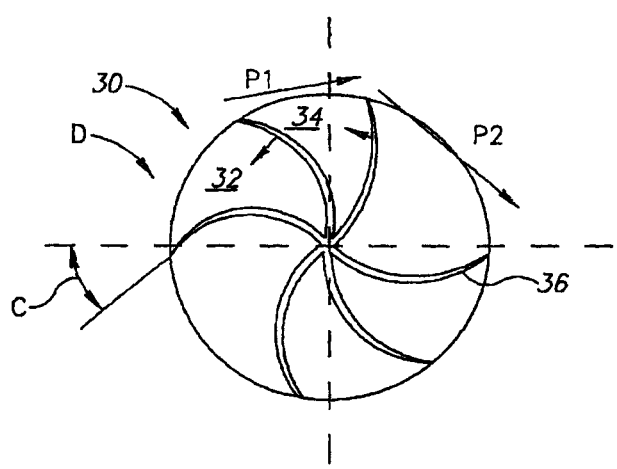
FIG. 5 is an end view, facing the end teeth, of an embodiment having special tooth spacing.

The value of C, illustrated in FIG. 5, exceeds fifteen degrees.

The value of L in one possible embodiment is between nine percent and ten percent of D.

The cutting edge 18 is curved away from the neck portion 16. The cutting edge 18 has a radius of curvature disposed toward the neck portion 16 between twenty-seven percent and twenty-eight percent of D.

In one possible embodiment of the present application, the cutting edge 18 extends over the length of L.

Figure 4:
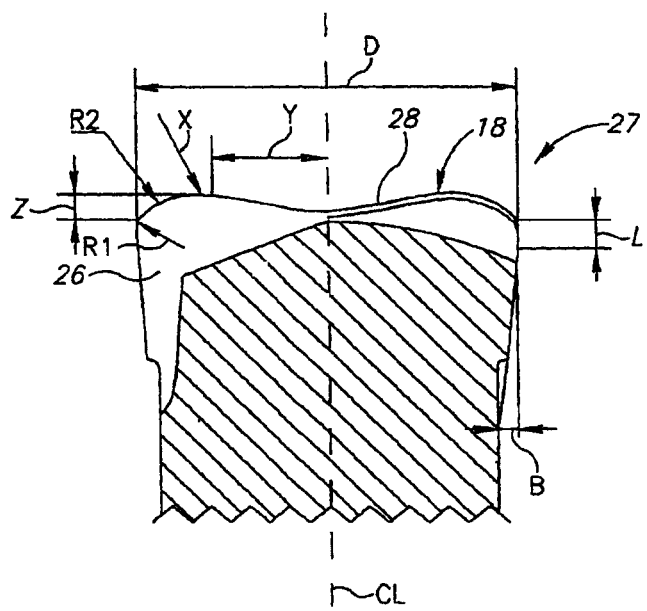
FIG. 4 is again a sectioned elevational view of the tip of a milling cutter provided with hard corners, including symbols useful for calculation of the milling cutter proportions.
Figure 4A:
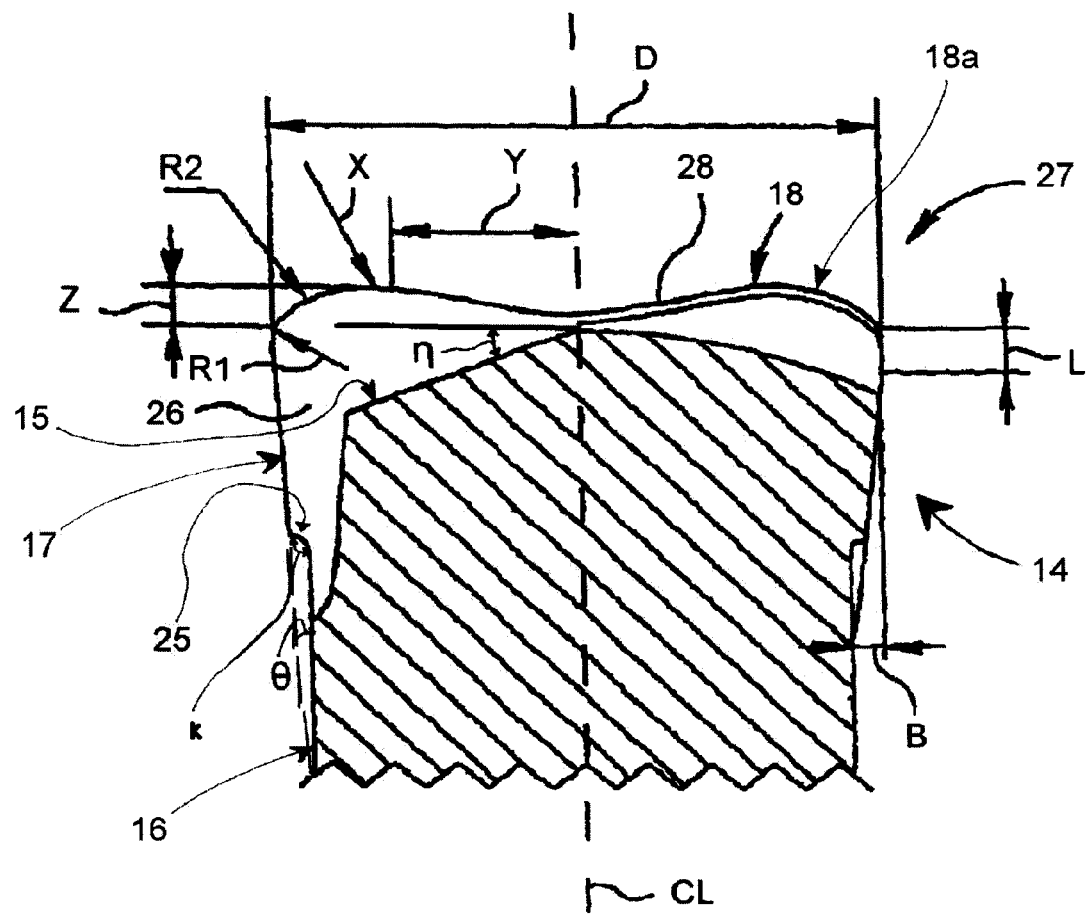
FIG. 4A is an enlarged sectioned elevational view of the tip of a milling cutter.

FIG. 4A shows the tip of a milling cutter similar to that as illustrated in FIG. 4. The portion 28 comprises a length about twenty-nine percent of the diameter D. The portion 18a of the cutting edge 18 comprises a length about twenty-two percent of the diameter D.

Also seen in FIG. 4A is the angle η, which measures the angular distance between the shortest height of the cutting edge 18 and the line 15 where the material 26 meets the neck portion 16. In one possible embodiment of the present application, the angle η measures about twenty-one degrees.

FIG. 4A illustrates a connecting surface 25 between a side portion 17 of the cutting portion 14 and the neck portion 16 of the milling cutter. The angle θ between the neck portion 16 and the side portion 17 is about two degrees. The connecting surface 25 is about three percent of the diameter D. The angle κ, in one possible embodiment, measures about one hundred sixteen degrees.

In one possible embodiment of the present application, the cutting edge 18 comprises a major portion that faces away from the neck portion 16, and a small portion that faces away from the cutting portion 14.

Figure 4B:
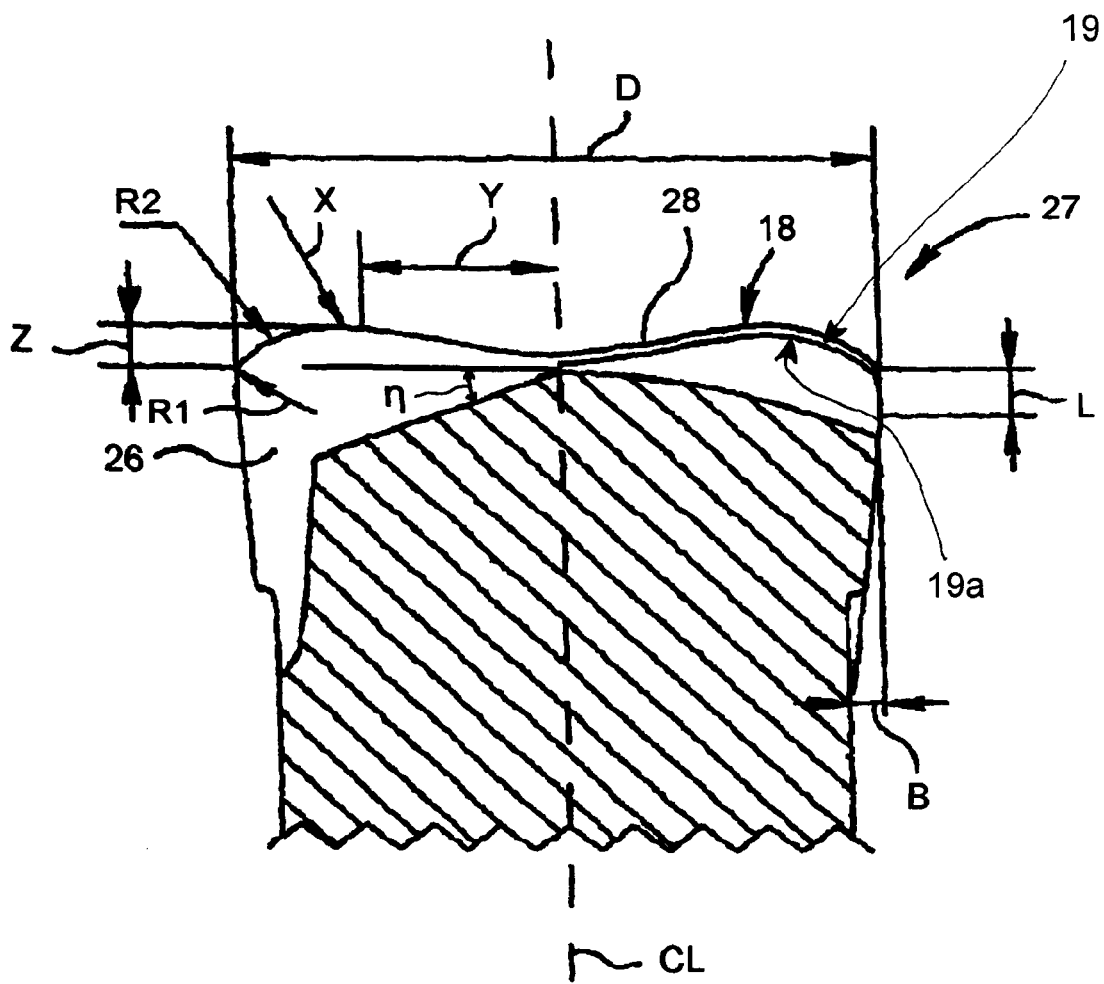
FIG. 4B is an enlarged sectioned elevational view of the tip of a milling cutter.

FIG. 4B shows the tip of a milling cutter similar to that as illustrated in FIG. 4. Further to the embodiment shown in FIG. 4, FIG. 4B also shows the cutting face 19 and the downstream edge 19a of the cutting face 19.

Figure 4C:
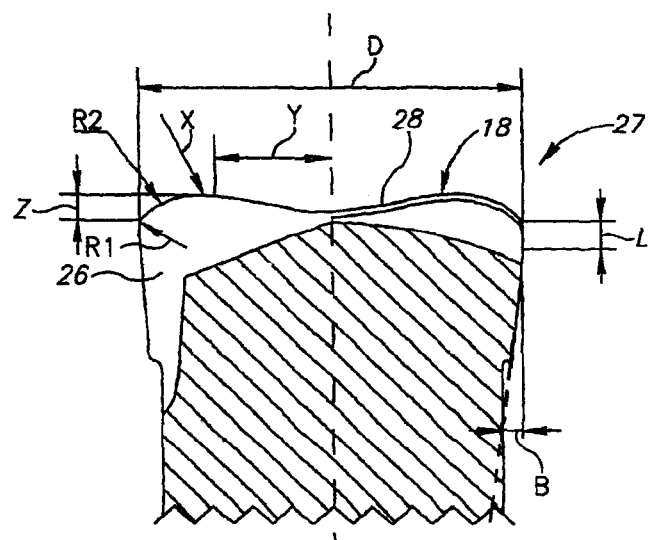
FIG. 4C is a sectioned elevational view of the tip of the milling cutter

FIG. 4C is a sectioned elevational view of the tip of the milling cutter 30, which shows the relief angle B in respect with the rotational axis CL.

Seen in FIG. 5 is a milling cutter 30 wherein the radial angular spacing P1 degrees between a first tooth 32 and a second adjacent tooth 34 is unequal to the angular spacing P2 degrees between the second tooth 34 and an adjacent third tooth 36. Irregular tooth spacing reduces vibration of the milling cutter 30 and the workpiece, possibly in frequencies near the resonant frequency. There is also seen the angle C, which was referred to in FIG. 4.

Figure 5A:
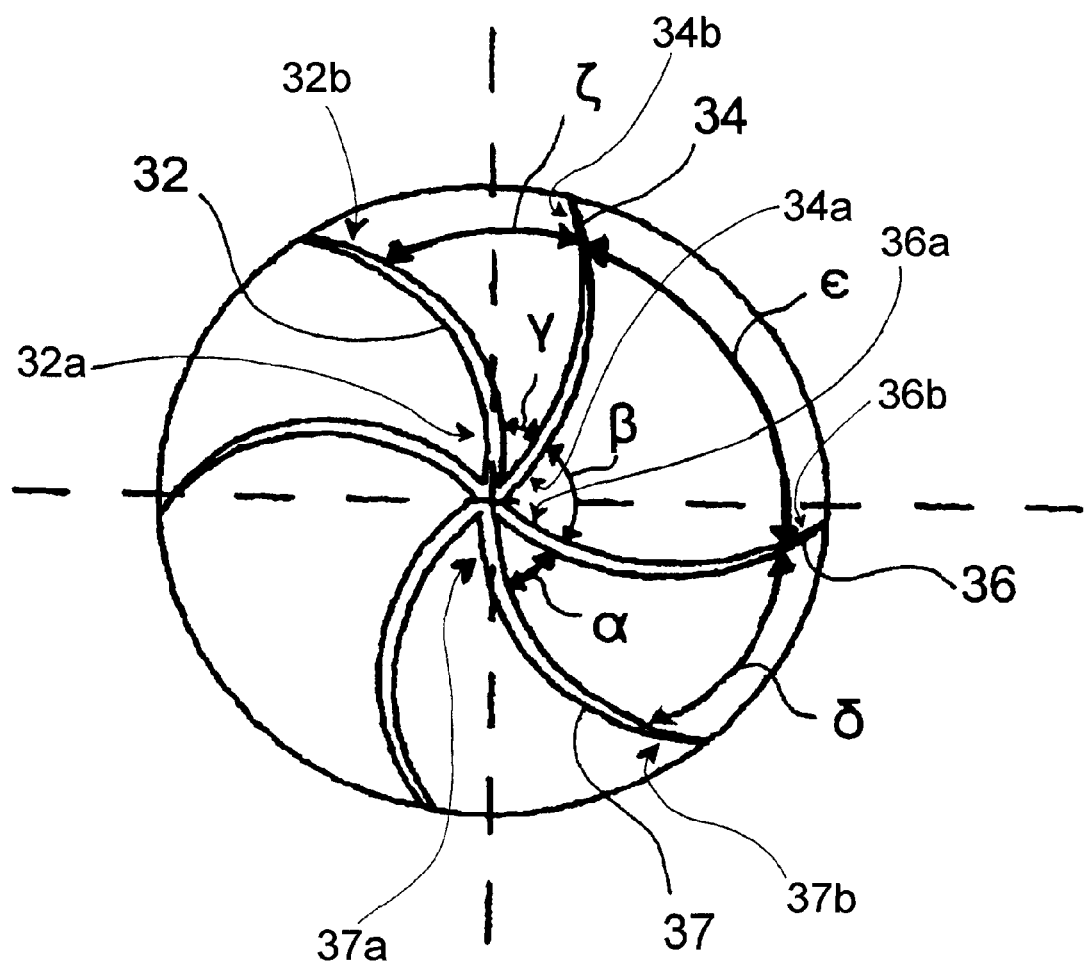
FIG. 5A shows an end view of a milling cutter with special tooth spacing according to one possible embodiment of the present application.

As further seen in FIGS. 5 and 5A, in one possible embodiment of the present application, the milling cutter 30 can comprise curved teeth, including at least teeth 32, 34, 36, and 37, with either all or some of the teeth comprising the same radius of curvature and with the teeth spaced irregularly across the circumference of the head of the milling cutter. Having teeth with identical or virtually identical radii of curvature may allow for similar angular spacing between the roots 32a and 34a of two adjacent teeth 32 and 34 and the tails 32b and 34b of the two adjacent teeth 32 and 34.

FIG. 5A shows the end of a milling cutter 30 with irregularly spaced tooth forms. The angular spacing between a first tooth 32 and a second tooth 34 is different from the angular spacing between the second tooth 34 and a third tooth 36.

In FIG. 5A, the tooth forms illustrated in this possible embodiment each have different radii of curvature, meaning that the angular spacing between the roots of two adjacent teeth, like roots 32a and 34a, differs from the angular spacing between the tails of the same two adjacent teeth, like tails 32b and 34b. For example, as seen in FIG. 5A, the angular spacing γ between the root 32a of tooth 32 and the root 34a of tooth 34 is about forty-three degrees. The angular spacing ζ between the tail 32b of tooth 32 and the tail 34b of tooth 34 is about fifty degrees. The angular spacing γ differs from angular spacing ζ by about three degrees. The angular spacing β between the root 34a of tooth 34 and the root 36a of tooth 36 is about eighty-four degrees. The angular spacing ε between the tail 34b of tooth 34 and the tail 36b of tooth 36 is about eighty degrees. The angular spacing β differs from angular distance ε by about four degrees. The angular spacing α between the root 36a of tooth 36 and the root 37a of tooth 37 is about forty-nine degrees. The angular spacing δ between the tail 36b of tooth 36 and the tail 37b of tooth 37 is about forty-seven degrees. The angular spacing α differs from angular spacing δ by about two degrees.

In other possible embodiments of the present application, the angular spacing between the roots and tails of teeth could vary in the range of about one degree to about eight degrees and within this range in increments of one degree.

FIG. 6 shows a milling cutter 38 wherein a coolant conduit 40 is provided leading from an axial inlet 42 through the shank portion 12 and the neck portion 16 through a part of the cutting portion 14. The conduit 40 terminates in two outlets 44 proximate to the cutting edges. In larger sizes such as in the range D=twenty-four to fifty-one, additional outlets 44 can be provided. As is known, delivery of the coolant to the location close to the cutting edge results in improved cooling thereof.

In FIG. 7 there is seen a table 46 specifying test conditions of milling cutters made according to the present application as well as for two prior-art cutters.

Test results are presented in FIGS. 8 and 9 in table 48 and bar graph 50.

Each machined pocket (not shown) is of a size that tool travel of 13.36 meters is desired for completion under the defined test conditions.

Time desired for completion of one pocket, the machine operating under computer control, is about 52.5 seconds when operating at a feed rate of about 15.3 meters/minute. The meaning of the word "pocket" in the present specification is a layer of metal 0.6 millimeters deep. Thus, if for example fifty pockets have been machined, the depth of the resulting recess is thirty millimeters.

The words "Geometry A" refer to the hard material 26 being the standard grade tungsten carbide in general use.

The words "Geometry B" refer to the hard material 26 being a premium grade such as, for example, Poly crystal diamond.

The bar graph 50 shows the relationship between wear on the milling cutter and the number of pockets machined at intermediate stages.

The superiority of the milling cutter made according to the present application is so large that inaccuracies, if any, in the conducted tests are of no significance.

Figure 10:
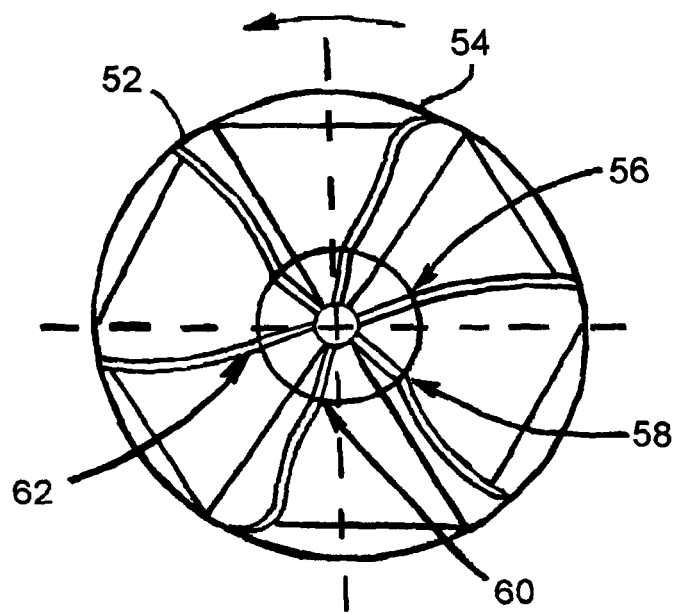
FIG. 10 is a view of tooth shape options available.
Figure 11:
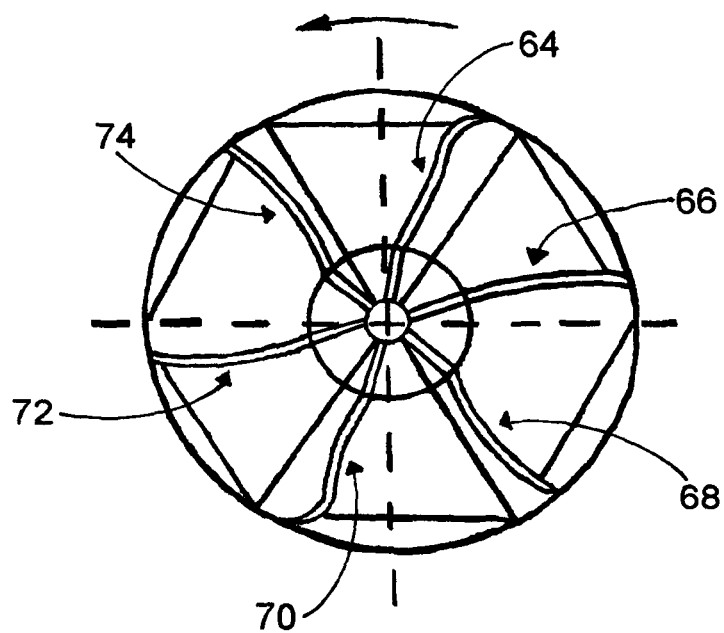
FIG. 11 is a view of tooth shape options available.

Turning now to FIGS. 10 and 11, there are seen some of the possible tooth forms, including at least one curved section.

Many of the various shapes illustrated represent combinations of two or even three sections such as convex curves, concave curves and straight sections, each being suitable for different machining conditions. The curves have been numbered 52 to 74 although no further comments are required as the shapes appear in the diagrams.

However, attention is drawn to the shape 56 where the cutting edge has a long convex curve. This shape has been found to be suitable for the difficult task of milling alloy steel having a hardness in the range 30 to 67 Hrc.

Figure 12:
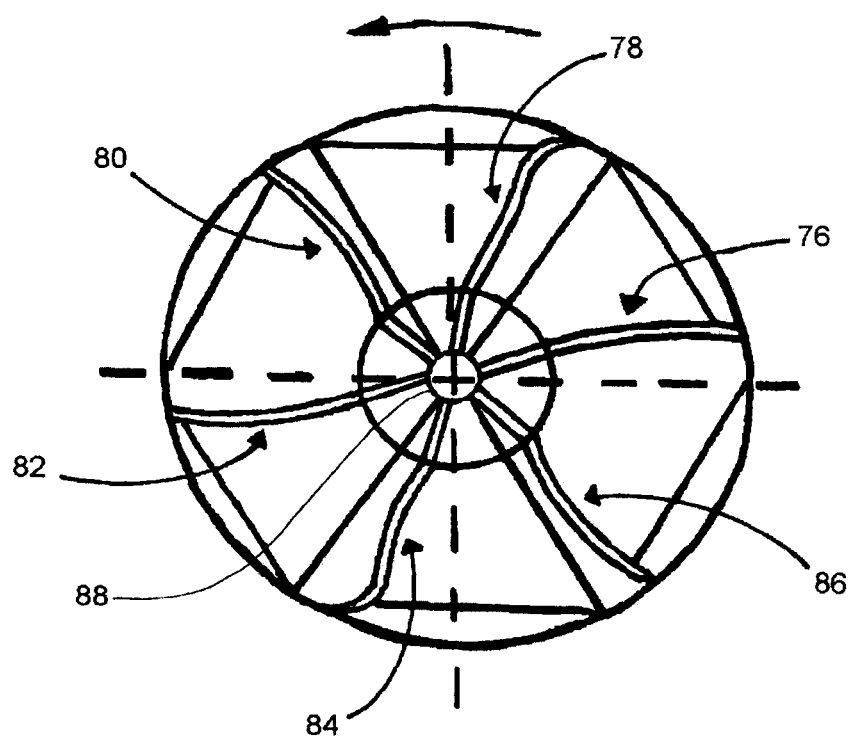
FIG. 12 is a view of tooth shape options for one possible embodiment of the present application.

FIG. 12 also shows possible tooth forms for a milling cutter, with possible variations shown as 76 through 86. In at least one possible embodiment of the present application, each tooth form is either partially curved or fully curved, with the curve either comprising a convex shape, a concave shape, or an s-shape. Such an s-shape could comprise both a convex shape and a concave shape.

In one possible embodiment of the present application, each tooth form on a milling cutter comprises a different radius of curvature, so every tooth form on one milling cutter varies from at least its adjacent teeth.

FIG. 12 also illustrates an outlet 88 of the coolant conduit 40.

Figure 13:
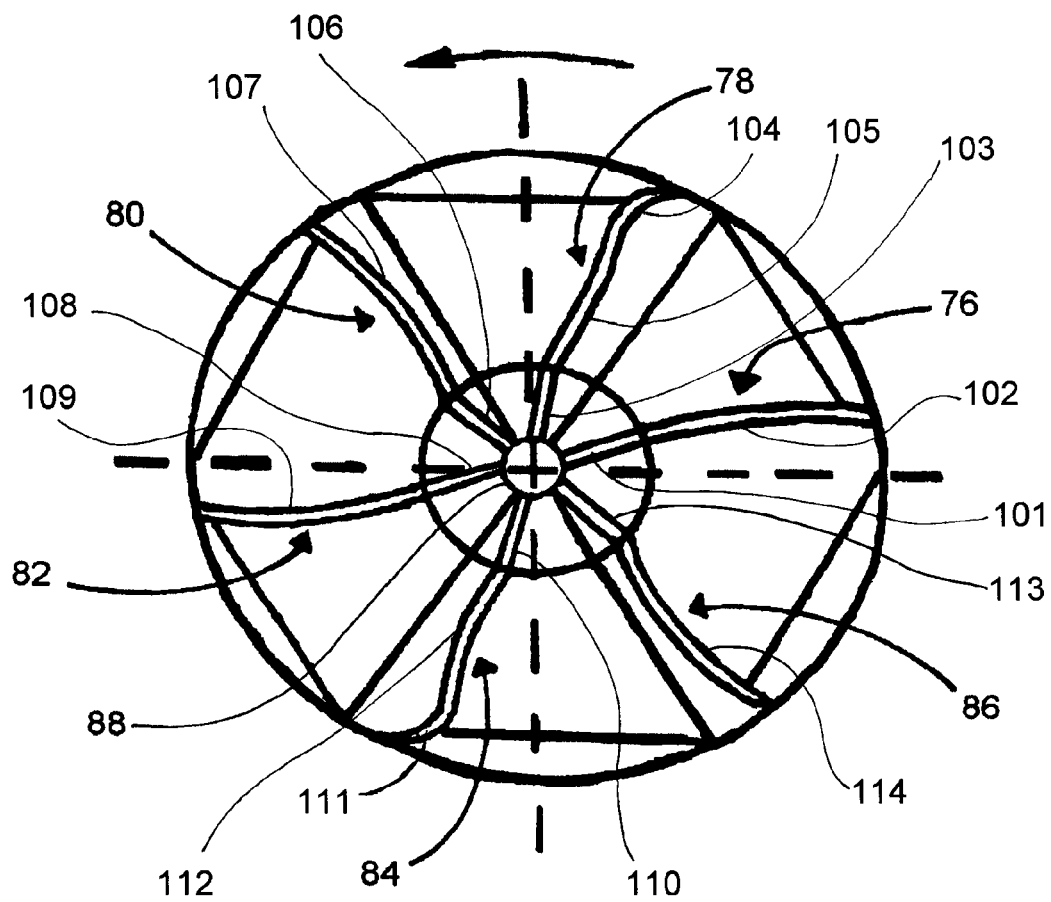
FIG. 13 is a view of tooth shape options for one possible embodiment of the present application.

In one possible embodiment of the present application as illustrated in FIG. 13, the tooth form 76 comprises two portions. The first portion 101 of tooth form 76, nearest the center of the head, is relatively straight. The second portion 102, between the first portion 101 and the outer circumference of the head, comprises a convex shape, i.e. curving outwardly in the cutting direction. The convex shape of second portion 102 of tooth form 76 has a radius of curvature that is about fifty-nine percent of the diameter D.

As further seen in FIG. 13, the tooth form 78 comprises three portions. The first portion 103 of tooth form 78, nearest the center of the head, is relatively straight. The second portion 104 of tooth form 78, nearest the outer circumference of the head, comprises a convex shape in the cutting direction. This second portion 104 of tooth form 78 comprises a radius of curvature that is about ten percent of the diameter D. The third portion 105 of tooth form 78, between the straight portion and the convex portion, is a concave shape, i.e. concave in the cutting direction. This third portion 105 of tooth form 78 comprises a radius of curvature that is about fifty-four percent of the diameter D.

As further seen in FIG. 13, the tooth form 80 comprises two portions. The first portion 106 of tooth form 80, nearest the center of the head, is relatively straight. The second portion 107 of tooth form 80, between the first portion 106 and the outer circumference of the head, is concave in the cutting direction, with a radius of curvature of about sixty-one percent of the diameter D.

As further seen in FIG. 13, the tooth form 82 comprises two portions. The first portion 108 of tooth form 82, nearest the center of the milling head, is relatively straight. The second portion 109 of tooth form 82, between the first portion 108 and the outer circumference of the head, comprises a convex shape in the cutting direction with a radius of curvature of about eight-two percent of the diameter D.

As further seen in FIG. 13, the tooth form 84 comprises three portions. The first portion 110 of tooth form 84, nearest the center of the head, is relatively straight. The second portion 111 of tooth form 84, nearest the outer circumference of the head, comprises a convex shape in the cutting direction with a radius of curvature of about eight percent of the diameter D. The third portion 112 of tooth form 84, between the first and third portions of tooth form 84, comprises a concave shape in the cutting direction with a radius of curvature of about thirty-seven percent of the diameter D.

As further seen in FIG. 13, the tooth form 86 comprises two portions. The first portion 113 of tooth form 86, nearest the center of the milling head, is relatively straight. The second portion 114 of tooth form 86, between the first portion 113 and the outer circumference of the head, comprises a concave shape in the cutting direction with a radius of curvature of about forty-three percent of the diameter D.

In other possible embodiments of the present application, the radii of curvature of the portions of the tooth forms could vary in the range of one hundred sixty-four percent to four percent and within this range in increments of one percent. The angular spacing between the tooth forms could also vary in the range of about twenty-seven and one half degrees to about one hundred fourteen degrees and within this range in increments of one degree.

Also in the embodiment illustrated in FIG. 13, the first portion 101 of tooth form 76 comprises a length of about eleven percent of the diameter D. The second portion 102 of tooth form 76 comprises a length of about thirty-three percent of the diameter D. The first portion 103 of tooth form 78 comprises a length of about eleven percent of the diameter D. The second portion 104 of tooth form 78 comprises a length of about sixteen percent of the diameter D. The third portion 105 of tooth form 78 comprises a length of about sixteen percent of the diameter D. The first portion 106 of the tooth form 80 comprises a length of about eleven percent of the diameter D. The second portion 107 of the tooth form 80 comprises a length of about thirty-two percent of the diameter D. The first portion 108 of tooth form 82 comprises a length of about eleven percent of the diameter D. The second portion 109 of tooth form 82 comprises a length of about thirty-two percent of the diameter D. The first portion 110 of tooth form 84 comprises a length of about eleven percent of the diameter D. The second portion 111 of tooth form 84 comprises a length of about thirteen and one half percent of diameter D. The third portion 112 of tooth form 84 comprises a length of about twenty percent of the diameter D. The first portion 113 of tooth form 86 comprises a length of about eleven percent of the diameter D. The second portion 114 of tooth form 86 comprises a length of about thirty-three percent of the diameter D.

In other possible embodiments according to the present application, the milling cutter could comprise teeth that are either partially of fully concave. The milling cutter could also comprise teeth that are either partially or fully convex shapes. The milling cutter could also comprise teeth that are either partially or fully s-shapes.

The scope of the present application is intended to include all embodiments coming within the meaning of the present application. The foregoing examples illustrate useful forms of the present application, but are not to be considered as limiting its scope, as those skilled in the art will be aware that additional variants and modifications of the present application can readily be formulated without departing from the meaning of the present application.

The present application relates to tools for the machining of materials by milling. The present application provides an improved form for a rotary cutting tool such as a face endmill, configured to extend tool life while increasing metal removal rates and reducing tool wear. The present application provides a face milling cutter, in the range four to fifty-one millimeter diameter, for fast metal removal having a shank portion adjoining a cutting portion, the cutting portion terminating in a plurality of end cutting edges positioned substantially radially from the axis of the milling cutter, the end cutting edges being curved at least along part of their length as viewed facing the end of the milling cutter.

The following patents, patent applications or patent publications, are hereby incorporated by reference as if set forth in their entirety herein: U.S. Pat. No. 5,727,910, issued to Felix LEEB, published on Mar. 17, 1998; U.S. Pat. No. 6,193,446, issued to Magnus ASTRÖM, et al., published on Feb. 27, 2001; U.S. Pat. No. 6,439,811, issued to Lon WARDELL, published Aug. 27, 2002; U.S. Pat. No. 6,846,135, issued to Takahito KURODA, et al., published on Jan. 25, 2005; US Patent Application No. 2002/0067964, issued to Toru SEKIGUCHI, et al., published on Jun. 6, 2006; US Patent Application No. 2002/0141833, issued to Mike MACARTHUR, published on Oct. 3, 2002; and US Patent Application No. 2005/0117982, issued to Avi DOV, et al., published Jun. 2, 2005.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

One feature or aspect of an embodiment is believed at the time of the filing of this patent application to possibly reside broadly in a face milling cutter for fast metal removal having a shank portion adjoining a cutting portion, said cutting portion terminating in a plurality of end cutting edges positioned substantially radially from the axis of the face milling cutter, said end cutting edges being curved at least along part of their length as viewed facing the end of said face milling cutter.

Another feature or aspect of an embodiment is believed at the time of the filing of this patent application to possibly reside broadly in the face milling cutter, wherein the outer diameter D thereof is in the range five millimeters to fifty-one millimeters.

Yet another feature or aspect of an embodiment is believed at the time of the filing of this patent application to possibly reside broadly in the face milling cutter, wherein at least the cutting edge and outer portion of said cutting edges is made of a brazed-on or other way joint material harder than shank portion material.

Still another feature or aspect of an embodiment is believed at the time of the filing of this patent application to possibly reside broadly in the face milling cutter, as viewed in an elevational projection the center of said cutting edges is nearer in an axial direction to said shank than point X being the point furthest away from said shank in an axial direction;
Y=the distance between X and the cutter axis;
Z=the axial distance between X and (the center of the first position at which said tooth reaches the diameter D) RI—the radius merging an end of R2 to L;
L=the axial length of the cutting edge disposed on the diameter D;
P1=is a curve, merging R1 through point X and extending over the axial length of Z;
R1=the radius merging an end of P to L;
B=the relief angle at each side; and
C=the angle between a straight radial line and a tangent meeting the outer extremity of the curved cutting edge.

A further feature or aspect of an embodiment is believed at the time of the filing of this patent application to possibly reside broadly in the face milling cutter, wherein the value of Y is between twenty percent and forty percent of D.

Yet another feature or aspect of an embodiment is believed at the time of the filing of this patent application to possibly reside broadly in the face milling cutter, wherein the value of Z is between two percent and nine percent of D.

Another feature or aspect of an embodiment is believed at the time of the filing of this patent application to possibly reside broadly in the face milling cutter, wherein the relief angle B at each side is in the range one-tenth of a degree to five degrees.

Yet another feature or aspect of an embodiment is believed at the time of the filing of this patent application to possibly reside broadly in the face milling cutter, wherein the clearance surface of each tooth is curved to be substantially parallel to said cutting edge.

Still another feature or aspect of an embodiment is believed at the time of the filing of this patent application to possibly reside broadly in the face milling cutter, wherein the value of L—the axial length of the cutting edge disposed on the diameter D about seventy percent to one hundred eighty percent of D.

A further feature or aspect of an embodiment is believed at the time of the filing of this patent application to possibly reside broadly in the face milling cutter, wherein the radial angular spacing between a first tooth and a second adjacent tooth is unequal to the angular spacing between said second tooth and an adjacent third tooth.

Another feature or aspect of an embodiment is believed at the time of the filing of this patent application to possibly reside broadly in the face milling cutter, wherein a coolant conduit is provided leading from an axial passage through said shank portion and through a part of said cutting portion to at least one outlet proximate to said cutting edges.

One feature or aspect of an embodiment is believed at the time of the filing of this patent application to possibly reside broadly in a milling cutter being configured to rotate about a rotational axis and cut metal, said milling cutter comprising a shank portion; a tip portion being disposed on an opposite end of said milling cutter than said shank portion; said tip portion being disposed on said milling cutter further from said shank portion than any other portion of said milling cutter; a rotational axis extending from said shank portion to said tip portion; said tip portion comprising: a front portion; a side portion; and a plurality of teeth comprising a first tooth; said first tooth comprising a cutting edge being configured to cut metal; said front portion being disposed on said tip portion further from said shank portion than any other portion of said tip portion; said front portion comprising portions being substantially transverse to the rotational axis; said side portion being disposed adjacent to said front portion on said tip portion; said side portion comprising surfaces being at least substantially aligned with the rotational axis; said first tooth extending at least from adjacent the rotational axis over said front portion of said tip portion and onto at least a portion of said side portion of said tip portion; said first tooth comprising a length from adjacent the rotational axis and along said side portion; and a portion of said first tooth being at least partially curved from adjacent the rotational axis to said side portion of said tip portion as seen from a direction parallel to the rotational axis and toward said tip portion.

Another feature or aspect of an embodiment is believed at the time of the filing of this patent application to possibly reside broadly in the milling cutter, wherein a portion of said first tooth is at least partially convexly curved away from said shank portion.

Yet another feature or aspect of an embodiment is believed at the time of the filing of this patent application to possibly reside broadly in the milling cutter, wherein said first tooth comprises: a first tooth portion adjacent the rotational axis; said first tooth portion comprising a portion being inwardly curved toward said shank portion to form a concave portion on said tip portion; a second tooth portion between said first tooth position and said side portion; and said second tooth portion comprising a portion being outwardly curved away from said shank portion to form a convex portion on said tip portion.

Still another feature or aspect of an embodiment is believed at the time of the filing of this patent application to possibly reside broadly in the milling cutter, wherein said first tooth portion is substantially the same length as said second tooth portion.

A further feature or aspect of an embodiment is believed at the time of the filing of this patent application to possibly reside broadly in the milling cutter, wherein said tip portion comprises a diameter; said second portion of said first tooth comprises a high point being disposed further away from said shank portion than any other part of said tip portion; and said high point being disposed at a distance from the rotational axis in a range of about twenty percent to about forty percent of said diameter.

Another feature or aspect of an embodiment is believed at the time of the filing of this patent application to possibly reside broadly in the milling cutter, wherein said second tooth portion and said side portion meet at a location disposed between said second tooth portion and said side portion; and said second tooth portion comprises a longitudinal height between said location and said high point in a range of about two percent to about nine percent of said diameter.

Yet another feature or aspect of an embodiment is believed at the time of the filing of this patent application to possibly reside broadly in the milling cutter, wherein said first tooth further comprises a third tooth portion disposed on said side portion of said tip portion adjacent to said second portion; and said third tooth portion comprising a length in the range of about seventy percent to about one hundred eighty percent of said diameter.

Still another feature or aspect of an embodiment is believed at the time of the filing of this patent application to possibly reside broadly in the milling cutter, wherein said side portion and the rotational axis with respect to one another form a relief angle in a range of about one-tenth of a degree to about five degrees.

A further feature or aspect of an embodiment is believed at the time of the filing of this patent application to possibly reside broadly in the milling cutter, wherein said plurality of teeth comprises said first tooth; a second tooth being adjacent to said first tooth; a third tooth being adjacent to said second tooth; said first tooth and said second tooth being disposed with respect to one another at a first angle; said second tooth and said third tooth being disposed with respect to one another at a second angle; and said first angle being substantially different than said second angle.

Another feature or aspect of an embodiment is believed at the time of the filing of this patent application to possibly reside broadly in the milling cutter, wherein said plurality of teeth each comprise similar profiles being at least partially convexly curved away from said shank portion.

Yet another feature or aspect of an embodiment is believed at the time of the filing of this patent application to possibly reside broadly in the milling cutter, wherein said plurality of teeth each comprise different profiles being at least partially convexly curved away from said shank portion.

Another feature or aspect of an embodiment is believed at the time of the filing of this patent application to possibly reside broadly in the milling cutter, wherein said plurality of teeth each comprise similar portions being at least partially curved from adjacent the rotational axis to said side portion of said tip portion.

Yet another feature or aspect of an embodiment is believed at the time of the filing of this patent application to possibly reside broadly in the milling cutter, wherein said plurality of teeth each comprise different portions being at least partially curved from adjacent the rotational axis to said side portion of said tip portion.

Still another feature or aspect of an embodiment is believed at the time of the filing of this patent application to possibly reside broadly in the milling cutter, wherein said diameter is in a range of about five millimeters to about fifty-one millimeters.

A further feature or aspect of an embodiment is believed at the time of the filing of this patent application to possibly reside broadly in the milling cutter, wherein said first tooth further comprises a cutting face which cutting face is curved to be substantially aligned with said cutting edge; and said milling cutter further comprises a cooling conduit comprising at least one outlet disposed on said tip portion disposed along the rotational axis and configured to deliver coolant to said at least one outlet.

Another feature or aspect of an embodiment is believed at the time of the filing of this patent application to possibly reside broadly in the milling cutter according to claim 15, wherein said shank portion comprises a material; at least said first tooth portion, said second tooth portion, and said third portion comprises a material configured to be harder than said material of said shank portion.

Yet another feature or aspect of an embodiment is believed at the time of the filing of this patent application to possibly reside broadly in the milling cutter, wherein a straight radial line from said rotational axis and a tangent extending outwardly from the outmost tip of said second portion forming a substantial acute angle with respect to one another; all of said plurality of teeth comprise a third portion corresponding to said third portion of said first tooth; all of said third portions being disposed circularly with respect to one another.

Still another feature or aspect of an embodiment is believed at the time of the filing of this patent application to possibly reside broadly in the milling cutter, wherein said first tooth is substantially one hundred eighty degrees apart from another tooth across the rotational axis; said first tooth and said another tooth comprise similar portions being at least partially curved from adjacent the rotational axis to said side portion of said tip portion; and said second tooth and said third tooth comprise similar portions being at least partially curved differently.

One feature or aspect of an embodiment is believed at the time of the filing of this patent application to possibly reside broadly in a face milling cutter being configured to rotate about a rotational axis and cut metal, said face milling cutter comprising: a shank portion; a tip; a neck portion being disposed between said shank portion and said tip; a rotational axis extending from said shank portion to said tip; said tip comprising: a front portion; a side portion; and a plurality of teeth comprising cutting edges being configured to cut metal; said front portion being disposed on said tip further from said shank portion than any other portion disposed on said tip; said front portion comprising portions being substantially transverse to the rotational axis; said side portion being disposed adjacent to said front portion on said tip; said side portion comprising surfaces being at least substantially aligned with the rotational axis; said cutting edges and said plurality of teeth extending at least from adjacent the rotational axis over said front portion of said tip and onto at least a portion of said side portion of said tip; each of said cutting edges and each of said plurality of teeth comprising a length from adjacent said rotational axis to said side portion; a portion of each of said cutting edges and a corresponding portion of each of said plurality of teeth on which each of said cutting edges is disposed comprising an at least partially convex portion curved away from said shank portion; and a portion of each of said cutting edges and a corresponding portion of each of said plurality of teeth on which each of said cutting edges is disposed being at least partially curved convexly or at least partially curved concavely from adjacent the rotational axis to said side portion of said tip as seen from a direction parallel to the rotational axis and toward said tip.

Another feature or aspect of an embodiment is believed at the time of the filing of this patent application to possibly reside broadly in the face milling cutter, wherein said portion of each of said cutting edges and said corresponding portion of each of said plurality of teeth on which each of said cutting edges is disposed are at least partially convexly curved away from said shank portion; said portion of each of said cutting edges and said corresponding portion of each of said plurality of teeth on which each of said cutting edges is disposed comprises: a first tooth portion adjacent the rotational axis; said first tooth portion comprising a portion being inwardly curved toward said shank portion to form a concave portion on said tip; a second tooth portion between said first tooth position and said side portion; and said second tooth portion comprising a portion being outwardly curved away from said shank portion to form a convex portion on said tip; said first tooth portion is substantially the same length as said second tooth portion; said tip comprises a diameter; said second portion of said portion of each of said cutting edges and said corresponding portion of each of said plurality of teeth on which each of said cutting edges is disposed comprises a high point being disposed further away from said shank portion than any other part of said tip; said high point being disposed at a distance from the rotational axis in a range of about twenty percent to about forty percent of said diameter; said second tooth portion and said side portion meet at a location disposed between said second tooth portion and said side portion; said second tooth portion comprises a longitudinal height between said location and said high point in a range of about two percent to about nine percent of said diameter; said portion of each of said cutting edges and said corresponding portion of each of said plurality of teeth on which each of said cutting edges is disposed further comprises: a third tooth portion disposed on said side portion of said tip adjacent to said second portion; said third tooth portion comprising a length in the range of about seventy percent to about one hundred eighty percent of said diameter; said side portion and the rotational axis with respect to one another form a relief angle in a range of about one-tenth of a degree to about five degrees; said plurality of teeth comprises: a first tooth; a second tooth being adjacent to said first tooth; a third tooth being adjacent to said second tooth; said first tooth and said second tooth being disposed with respect to one another at a first angle; said second tooth and said third tooth being disposed with respect to one another at a second angle; and said first angle being substantially different than said second angle; said plurality of teeth each comprise similar profiles being at least partially convexly curved away from said shank portion; said plurality of teeth each comprise different profiles being at least partially convexly curved away from said shank portion; said plurality of teeth each comprise similar portions being at least partially curved from adjacent the rotational axis to said side portion of said tip; said plurality of teeth each comprise different portions being at least partially curved from adjacent the rotational axis to said side portion of said tip; said diameter is in a range of about five millimeters to about fifty-one millimeters; said portion of each of said cutting edges and said corresponding portion of each of said plurality of teeth on which each of said cutting edges is disposed further comprises a cutting face which cutting face is curved to be substantially aligned with said cutting edge; said milling cutter further comprises a cooling conduit comprising at least one outlet disposed on said tip disposed along the rotational axis and configured to deliver coolant to said at least one outlet; said shank portion comprises a material; at least said first tooth portion, said second tooth portion, and said third portion comprises a material configured to be harder than said material of said shank portion; a straight radial line from said rotational axis and a tangent extending outwardly from the outmost tip of said second portion forming a substantial acute angle with respect to one another; all of said plurality of teeth comprise a third portion corresponding to said third portion of said first tooth; all of said third portions being disposed circularly with respect to one another; said first tooth is substantially one hundred eighty degrees apart from another tooth across the rotational axis; said first tooth and said another tooth comprise similar portions being at least partially curved from adjacent the rotational axis to said side portion of said tip; and said second tooth and said third tooth comprise similar portions being at least partially curved differently.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Israeli Patent Application No. 174775, filed on Apr. 4, 2006, having inventors Vladimir VOLOKH, Sergei BOULAKHOV and Shay ZEIDNER, and International Application No. PCT/IL2007/000409, filed on Mar. 29, 2007, having WIPO Publication No. WO2007/113812 and inventors Vladimir VOLOKH, Sergei BOULAKHOV, and Shay ZEIDNER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in Israel and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/IL2007/000409 and Israeli Patent Application 174775 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/IL2007/000409 and Israeli Patent Application 174775 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A face milling cutter having a shank portion adjoining a cutting portion, said cutting portion terminating in a plurality of cutting edges extending in a radial direction from a central axis of the face milling cutter, said cutting edges being convexly curved at least along a part of their length, wherein a portion of the cutting edges proximate the central axis is nearer in an axial direction to the shank portion than a point, X, on the cutting edges that is farthest away from the shank portion, and wherein a distance, Y, between the point, X, and the central axis is between 20% and 40% of a diameter, D, of the face milling cutter, and wherein a central portion extends the distance, Y, and has a radius of curvature of about 110% of the diameter, D.

2. The face milling cutter as claimed in claim 1, wherein the diameter, D, is in a range between 5 mm and 51 mm.

3. The face milling cutter as claimed in claim 1, wherein a portion of the cutting edges is made of a first material, and wherein a portion of the shank portion is made of a second material, and wherein the first material has a hardness that is greater than a hardness of the second material.

4. The face milling cutter as claimed in claim 3, wherein the first material extends along an outer surface of the face milling cutter in the axial direction a distance of about 70% to 180% of the diameter, D.

5. The face milling cutter as claimed in claim 1, further comprising a radius, R2, extending from the point, X, an axial length, Z, to the diameter, D, is in a range between 5% and 15% of the diameter, D.

6. The face milling cutter as claimed in claim 1, further comprising a coolant conduit extending through the shank portion and a portion of the cutting portion to at least one outlet proximate to the cutting edges.

7. The face milling cutter as claimed in claim 1, wherein a radial angular spacing between a first cutting edge and a second adjacent cutting edge is unequal to an angular spacing between the second cutting edge and an adjacent third cutting edge.

8. The face milling cutter as claimed in claim 1, wherein an angle, C, between a straight radial line and a tangent extending from the cutting edges at the diameter, D, is greater than 15 degrees.

9. The face milling cutter as claimed in claim 1, wherein an axial distance, Z, between the point, X, and the diameter, D, is between 2% and 9% of the diameter, D.

10. The face milling cutter as claimed in claim 1, wherein a relief angle, B, of the face milling cutter is between 0.1 degrees and 5 degrees.

11. A face milling cutter having a shank portion adjoining a cutting portion, said cutting portion terminating in a plurality of cutting edges extending in a radial direction from a central axis of the face milling cutter, said cutting edges being convexly curved at least along a part of their length, wherein a portion of the cutting edges proximate the central axis is nearer in an axial direction to the shank portion than a point, X, on the cutting edges that is farthest away from the shank portion, and wherein an axial distance, Z, between the point, X, and a diameter, D, of the face milling cutter is between 2% and 9% of the diameter, D, and wherein a central portion extends from the central axis to the point, X, and has a radius of curvature of about 110% of the diameter, D.

12. A face milling cutter having a shank portion adjoining a cutting portion, said cutting portion terminating in a plurality of cutting edges extending in a radial direction from a central axis of the face milling cutter, said cutting edges being convexly curved at least along a part of their length, wherein a portion of the cutting edges proximate the central axis is nearer to the shank portion in an axial direction than a point, X, that is farthest away from the shank portion in the axial direction, and wherein a relief angle, B, of the face milling cutter is between 0.1 degrees and 5 degrees, and wherein a central portion extends from the central axis to the point, X, and has a radius of curvature of about 110% of the diameter, D.

* * * * *